(12) United States Patent
Ikazaki et al.

(10) Patent No.: US 10,942,691 B2
(45) Date of Patent: Mar. 9, 2021

(54) IMAGE FORMING APPARATUS HAVING COPY FUNCTION FOR EXECUTING COPY JOB

(71) Applicant: KYOCERA Document Solutions Inc., Osaka (JP)

(72) Inventors: Akihiko Ikazaki, Osaka (JP); Shinichi Hashimoto, Osaka (JP); Kunihiko Shimamoto, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 16/674,945

(22) Filed: Nov. 5, 2019

(65) Prior Publication Data
US 2020/0142646 A1  May 7, 2020

(30) Foreign Application Priority Data
Nov. 5, 2018 (JP) .............................. JP2018-207903

(51) Int. Cl.
*G06F 3/12* (2006.01)
*H04N 1/32* (2006.01)
*G06K 15/00* (2006.01)
*G06K 15/02* (2006.01)

(52) U.S. Cl.
CPC .............. *G06F 3/124* (2013.01); *G06F 3/122* (2013.01); *G06F 3/1241* (2013.01); *G06K 15/1817* (2013.01); *G06K 15/401* (2013.01); *H04N 1/32448* (2013.01); *G06F 3/1267* (2013.01)

(58) Field of Classification Search
None
See application file for complete search history.

(56) References Cited

U.S. PATENT DOCUMENTS

| 6,421,135 | B1* | 7/2002 | Fresk | ................ | H04N 1/00915 |
| | | | | | 358/1.13 |
| 2010/0316406 | A1* | 12/2010 | Minamikawa | ......... | G03G 15/50 |
| | | | | | 399/83 |
| 2014/0036288 | A1* | 2/2014 | Sakuragi | ............ | H04N 1/32443 |
| | | | | | 358/1.13 |

(Continued)

FOREIGN PATENT DOCUMENTS

JP    2001-058431 A    3/2001

*Primary Examiner* — Miya J Williams
(74) *Attorney, Agent, or Firm* — Hawaii Patent Services; Nathaniel K. Fedde; Kenton N. Fedde

(57) ABSTRACT

Provided is an image forming apparatus capable of executing a copy job without causing a memory shortage by dividing and sequentially executing the copy job process. The image forming apparatus includes a free area determining unit and a division process executing unit. The free area determining unit compares capacities of work areas necessary for executing a scanning job and a printing job with free area in memory (RAM), respectively. The division process executing unit, in a case where the free area determining unit determines that the free area in memory is equal to or greater than the capacity of the work area necessary for executing the scanning job, but is less than the capacity of the work area necessary for executing the printing job, cancels parallel processing, and after executing the scanning process, saves in a non-volatile memory, and then after restarting, executes the printing process.

2 Claims, 2 Drawing Sheets

(56) References Cited

U.S. PATENT DOCUMENTS

| | | | |
|---|---|---|---|
| 2016/0165089 A1* | 6/2016 | Goto | H04N 1/60 358/1.16 |
| 2016/0255230 A1* | 9/2016 | Tabushi | H04N 1/32448 358/1.14 |
| 2017/0163822 A1* | 6/2017 | Sugiyama | H04N 1/0096 |
| 2018/0109694 A1* | 4/2018 | Akiyoshi | G06F 3/1237 |

* cited by examiner

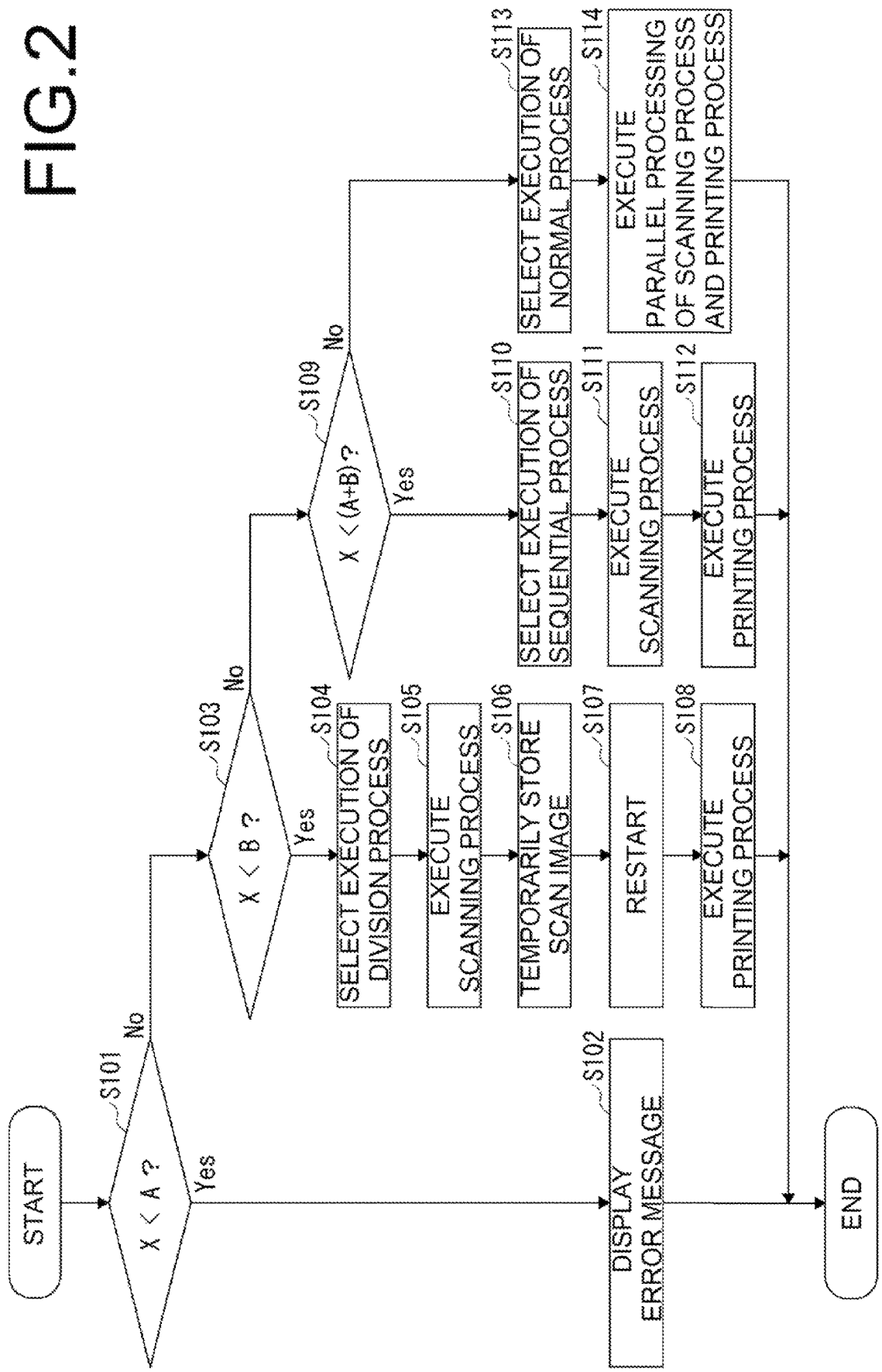

IMAGE FORMING APPARATUS HAVING COPY FUNCTION FOR EXECUTING COPY JOB

INCORPORATION BY REFERENCE

This application is based on and claims the benefit of priority from Japanese Patent Application No. 2018-207903 filed on Nov. 5, 2018, the contents of which are hereby incorporated by reference.

BACKGROUND

The present disclosure relates to an image forming apparatus having a copy function for executing a copy job.

In typical technology, there is a technique in which a copy job is divided into page units and processed as necessary when memory over error occurs.

SUMMARY

The image forming apparatus according to the present disclosure is an image forming apparatus having: a scanning function for executing a scanning process based on a scanning job; a printing function for executing a printing process based on a printing job; and a copy function for executing the scanning process and the printing process based on a copy job; wherein execution of the copy job performs parallel processing of the scanning process and the printing process. The image forming apparatus includes a free area determining unit and a division process executing unit. The free area determining unit, when there is an instruction to execute the copy job, compares a capacity of a work area necessary for executing a job with a free area in memory. The division process executing unit, in a case where the free area determining unit determines that the free area in memory is equal to or greater than a capacity of a work area necessary for executing the scanning job, but is less than a capacity of a work area necessary for executing the printing job, cancels the parallel processing, and after executing the scanning process, saves in non-volatile memory, and then after restarting, executes the printing process.

Moreover, the image forming apparatus according to the present disclosure is an image forming apparatus having: a scanning function for executing a scanning process based on a scanning job; a printing function for executing a printing process based on a printing job; and a copy function for executing the scanning process and the printing process based on a copy job; wherein execution of the copy job performs parallel processing of the scanning process and the printing process. The image forming apparatus includes a free area determining unit and a sequential process executing unit. The free area determining unit, when there is an instruction to execute the copy job, compares a capacity of a work area necessary for executing a job with a free area in memory. The sequential process executing unit, in a case where the free area determining unit determines that the free area in memory is equal to or greater than a capacity of a work area necessary for executing the printing job, but is less than a capacity of a work area necessary for executing the copy job, cancels the parallel processing, and after executing the scanning process, executes the printing process.

Moreover, the image forming apparatus according to the present disclosure is an image forming apparatus having: a scanning function for executing a scanning process based on a scanning job; a printing function for executing a printing process based on a printing job; and a copy function for executing the scanning process and the printing process based on a copy job; wherein execution of the copy job performs parallel processing of the scanning process and the printing process. The image forming apparatus includes a free area determining unit, a division process executing unit, and a sequential process executing unit. The free area determining unit, when there is an instruction to execute the copy job, compares a capacity of a work area necessary for executing a job with a free area in memory. The division process executing unit, in a case where the free area determining unit determines that the free area in memory is equal to or greater than a capacity of a work area necessary for executing the scanning job, but is less than a capacity of a work area necessary for executing the printing job, cancels the parallel processing, and after executing the scanning process, saves in non-volatile memory, and then after restarting, executes the printing process. The sequential process executing unit, in a case where the free area determining unit determines that the free area in memory is equal to or greater than a capacity of a work area necessary for executing the printing job, but is less than a capacity of a work area necessary for executing the copy job, cancels the parallel processing, and after executing the scanning process, executes the printing process.

BRIEF DESCRIPTION OF THE DRAWINGS

FIG. 2 is a flowchart for explaining the operation of the image forming apparatus illustrated in FIG. 1.

DETAILED DESCRIPTION

Figure 1:
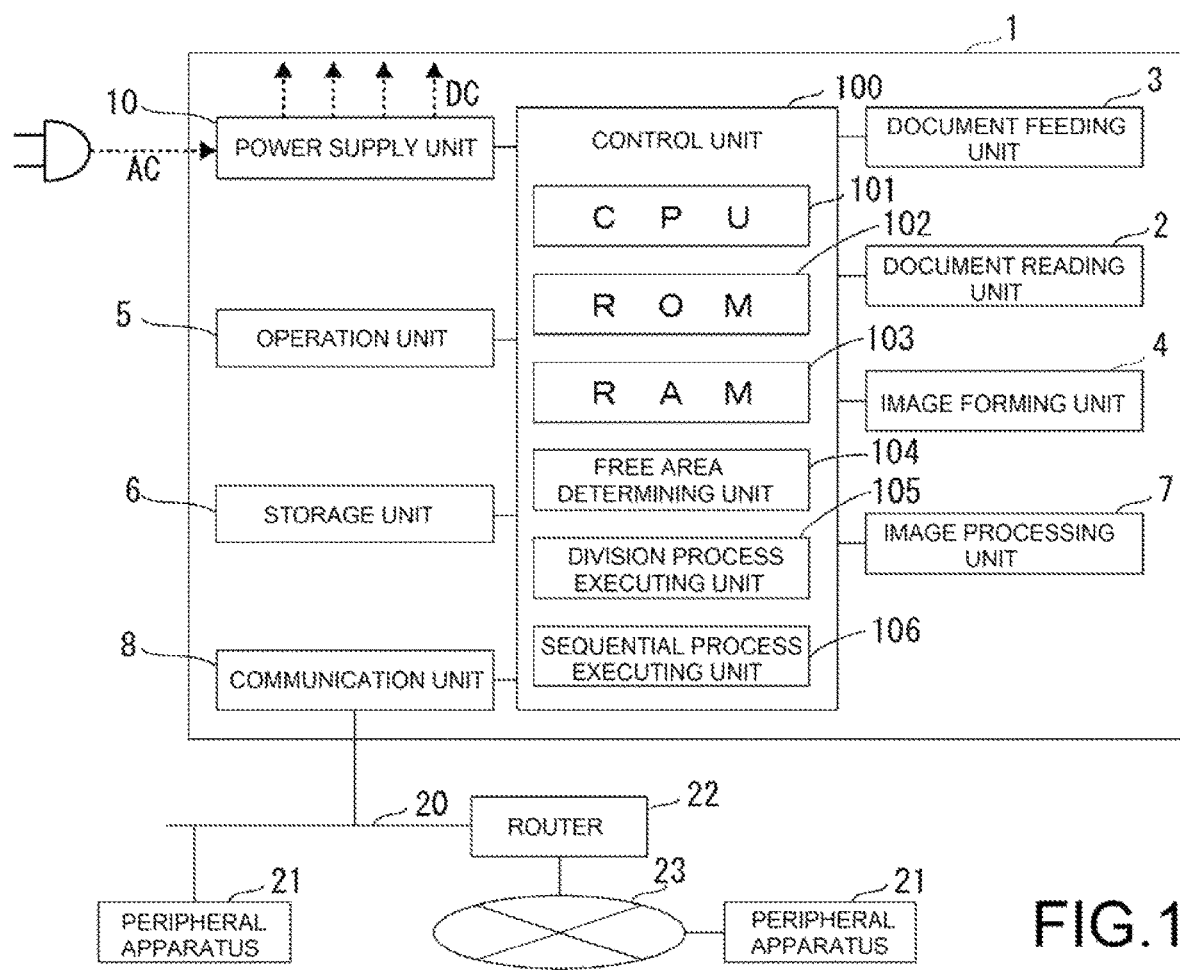
FIG. 1 is a block diagram illustrating a schematic configuration of an embodiment of an image forming apparatus according to the present disclosure.

In the following, embodiments of the present disclosure will be described in detail with reference to the drawings. Note that, in the following embodiments, the same reference numbers are given to configurations indicating similar functions.

The image forming apparatus 1 according to the present embodiment is a MFP (Multifunction Peripheral/Printer/Product), which includes a scanning function that executes a scanning process based on a scanning job, a printing function that executes a printing process based on a printing job, and a copy function that executes a scanning process and a printing process based on a copy job. Referring to FIG. 1, the image forming apparatus 1 includes a document reading unit 2, a document feeding unit 3, an image forming unit 4, an operation unit 5, a storage unit 6, an image processing unit 7, a communication unit 8, a power supply unit 10 and a control unit 100.

The document reading unit 2 is a reading unit that reads a document image by irradiating light on a document and receiving the reflected light or the like thereof, and includes a contact glass on which a document is placed, and a slit glass provided in the conveyance path of the document feeding unit 3.

The document feeding unit 3 sequentially feeds documents placed on the document placement surface one by one and feeds them to the document reading unit 2. In addition, the document feeding unit 3 and the document reading unit 2 are connected by a hinge mechanism on the back side of the image forming apparatus 1 so as to be able to rotate, and the document feeding unit 3 functions as a rotatable document table cover provided so as to face the contact glass. By opening the document feeding unit 3 upward, the upper surface of the contact glass is opened, and the document can be set on the contact glass.

The image forming unit 4 includes, for example, a photosensitive drum, a charging unit, an exposing unit, a developing unit, a transferring unit, a cleaning unit, and a fixing unit, and records a formed image on recording paper.

The operation unit 5 is provided with a display unit such as a liquid crystal display or the like and various operation buttons. The user, by operating the operation unit 5 and by inputting instruction, performs various settings of the image forming apparatus 1 and executes various functions such as image formation and the like. The operation unit 5 displays the status of the image forming apparatus 1, displays the image forming status and the number of print copies, and as a touch panel can be used to perform various functions such as double-sided printing, black-and-white reversal, and the like, and various settings such as a magnification setting, density setting and the like.

The storage unit 6 is a non-volatile storage unit such as a semiconductor memory, an HDD (Hard Disk Drive) or the like.

The image processing unit 7 is an arithmetic processing circuit such as a microcomputer or the like including a CPU (Central Processing Unit), a ROM (Read Only Memory), a RAM (Random Access Memory), and the like. The image processing unit 7 executes various jobs related to image processing such as enlargement/reduction processing, density adjustment processing, gradation adjustment processing, and the like.

The communication unit 8 has a function of transmitting/receiving various data to/from a peripheral apparatus 21 such as a personal computer or the like via a network 20 such as a LAN or the like. In addition, the communication unit 8 is configured to be connectable to the Internet 23 via the network 20 and a router 22. Moreover, the communication unit 8 has a function of transmitting/receiving various data to/from various communication apparatuses connected to the Internet 23.

The power supply unit 10 converts a commercial AC power supply AC into a direct current voltage DC that can be used in each unit of the image forming apparatus 1, and supplies the converted direct current voltage DC to each unit of the image forming apparatus 1 as a power supply.

The control unit 100 is an information processing unit such as a microcomputer or the like that includes a CPU 101, a ROM 102, a RAM 103, and the like. The ROM 102 stores a control program for controlling the operation of the image forming apparatus 1. The CPU 101 performs overall control of the apparatus by reading a control program stored in the ROM 102 and developing the control program in the RAM 103. Moreover, the free area of the RAM 103 is a work area in which the scan image that is read by the document reading unit 2 is stored and a correction process for the stored scan image is executed. Furthermore, the free area of the RAM 103 becomes a work area for generating a print image to be printed on recording paper by the image forming unit 4 based on the corrected scan image and job setting information.

In addition, the control unit 100 functions as a free area determining unit 104, a division process executing unit 105, and a sequential process executing unit 106.

In the free area determining unit 104, a capacity of a work area necessary for execution is set for each type of job. In this embodiment, the work area necessary for executing a scanning job is set to "A", the work area necessary for executing a printing job is set to "B", which is larger than "A", and the work area necessary for executing a copy job is set to "A+B", respectively. Note that the execution of a copy job is set so that the scanning process and the printing process are processed in parallel to improve performance.

When there is an instruction for execution of a job, the free area determining unit 104 compares the capacity of the work area necessary for executing the job with the free area X of the RAM 103. According to the comparison results, the free area determining unit 104 selects and executes any one of a normal process, a division process by the division process executing unit 105, and a sequential process by the sequential process executing unit 106.

Next, operation when there is an instruction for execution of a copy job in the image forming apparatus 1 will be described in detail with reference to FIG. 2.

When there is an instruction for execution of a copy job, the free area determining unit 104 determines whether or not the free area X of the RAM 103 is less than the work area "A" necessary for executing the scanning job (step S101).

In a case where the free area X is less than the work area "A" in step S102, the free area determining unit 104 causes the operation unit 5 to display an error message notifying that restart is necessary for executing the copy job (step S102), and terminates the operation. Note that even when there is an instruction for execution of a scanning job and the free area X is less than the work area "A", the free area determining unit 104 causes the operation unit 5 to display a similar error message, and terminates the operation.

In a case where the free area X is greater than or equal to the work area "A" in step S102, the free area determining unit 104 determines whether or not the free area X in the RAM 103 is less than the work area "B" necessary for executing the scanning job (step S103).

In a case where the free area X is less than the work area "B" in step S103, the free area determining unit 104 selects execution of a division process by the division process executing unit 105 (step S104).

The division process executing unit 105 cancels the parallel processing of the scanning process and the printing process, reads the scan image by the document reading unit 2 using the free area X of the RAM 103 as a work area, and executes the scanning process that executes the correction processing of the read scan image (step S105).

Next, the division process executing unit 105 temporarily stores the corrected scan image and job setting information in the storage unit 6 that is a nonvolatile storage unit (step S106).

Next, the division process executing unit 105 instructs the power supply unit 10 to restart, and restarts the image forming apparatus 1 (step S107).

After the restart, the division process executing unit 105 generates a print image to be printed on the recording paper by the image forming unit 4 based on the corrected scan image temporarily stored in the storage unit 6 and the job setting information, executes a printing process (step S108), and terminates the operation.

In a case where the free area X is greater than or equal to the work area "B" in step S103, the free area determining unit 104 determines whether or not the free area X in the RAM 103 is less than the work area "A+B" necessary for executing a copy job (step S109).

In a case where the free area X is less than the work area "A+B" in step S109, the free area determining unit 104 selects execution of a sequential process by the sequential process executing unit 106 (step S110).

The sequential process executing unit 106 cancels the parallel processing of the scanning process and the printing process, reads the scan image by the document reading unit 2 using the free area X of the RAM 103 as a work area, and executes the scanning process that executes the correction processing of the read scan image (step S111).

Next, the sequential process executing unit 106 generates a print image to be printed on recording paper by the image forming unit 4 based on the corrected scan image and job setting information after the completion of the scanning process, executes a printing process (step S112), and terminates the operation.

In a case where the free area X is equal to or greater than the work area "A+B" in step S109, the free area determining unit 104 selects execution of a normal process that performs parallel processing of the scanning process and the printing process (step S113). As a result, parallel processing of the scanning process and the printing process is executed (step S114), and the operation ends.

As described above, the present embodiment is an image forming apparatus having: a scanning function for executing a scanning process based on a scanning job; a printing function for executing a printing process based on a printing job; and a copy function for executing a scanning process and a printing process based on a copy job; wherein execution of the copy job performs parallel processing of a scanning process and a printing process; the image forming apparatus includes: a free area determining unit 104 that, when there is an instruction to execute a copy job, compares capacities of work areas necessary for executing a scanning job and a printing job with a free area X in memory (RAM 103), respectively; and a division process executing unit 105 that in a case where the free area determining unit 104 determines that the free area X in memory is equal to or greater than a capacity "A" of a work area necessary for executing a scanning job, but is less than a capacity "B" of a work area necessary for executing a printing job, cancels parallel processing, and after a scanning process is executed, saves in non-volatile memory, and after restarting, executes a printing process.

With this configuration, in a case where the free area X in memory is equal to or greater than the capacity "A" of the work area necessary for executing the scanning job, but is less than the capacity "B" of the work area necessary for executing the printing job, by dividing and sequentially executing the copy job, the copy job can be executed without causing a memory shortage.

Moreover, the present embodiment is an image forming apparatus 1 having: a scanning function for executing a scanning process based on a scanning job; a printing function for executing a printing process based on a printing job; and a copy function for executing a scanning process and a printing process based on a copy job; wherein execution of the copy job performs parallel processing of a scanning process and a printing process; the image forming apparatus 1 includes: a free area determining unit 104 that, when there is an instruction to execute a copy job, compares capacities of work areas necessary for executing a printing job and a copy job with a free area X in memory (RAM 103), respectively; and a sequential process executing unit 106 that, in a case where the free area determining unit 104 determines that the free area X in memory is equal to or greater than the capacity "B" of a work area necessary for executing the printing job, but is less than the capacity "A+B" of a work area necessary for executing the copy job, cancels the parallel processing, and after executing the scanning process, executes the printing process.

With this configuration, in a case where the free area X in memory is equal to or greater than the capacity "B" of a work area necessary for executing the printing job, but is less than the capacity "A+B" of a work area necessary for executing the copy job, by dividing and sequentially executing the copy job process, it is possible without restarting to execute the copy job without causing a memory shortage.

In the typical technique described above, a job is divided into pages, so in a case where a scanning process and a printing process based on a copy job are set to be processed in parallel, there is a possibility that memory over may still occur.

With the technique according to the present disclosure, there is an effect that even in a case where the free area in memory is less than the work area necessary for executing the copy job, by dividing and sequentially executing the process of the copy job, the copy job can be executed without causing a memory shortage.

Note that the technique according to the present disclosure is not limited to the embodiments described above, and it is obvious that the embodiments may be appropriately modified within the scope of the technical idea of the present disclosure. Moreover, the number, position, shape, and the like of the constituent members described above are not limited to the embodiments described above, and may be set to a suitable number, position, shape, and the like for carrying out the technique according to the present disclosure. Incidentally, in each figure, the same reference numbers are given to the identical components.

What is claimed is:

1. An image forming apparatus having: a scanning function for executing a scanning process based on a scanning job; a printing function for executing a printing process based on a printing job; and a copy function for executing the scanning process and the printing process based on a copy job; wherein execution of the copy job performs parallel processing of the scanning process and the printing process;

the image forming apparatus comprising:
a free area determining unit configured to, when there is an instruction to execute the copy job, compares a capacity of a work area necessary for executing a job with a free area in memory; and
a division process executing unit configured to, in a case where the free area determining unit determines that the free area in memory is equal to or greater than a capacity of a work area necessary for executing the scanning job, but is less than a capacity of a work area necessary for executing the printing job, cancels the parallel processing, and after a scanning process is executed, saves in a non-volatile memory, and then after restarting, executes the printing process; wherein
the division process executing unit is configured to, in said case, instruct a power supply unit to perform said restart, thereby causing said restart of the image forming apparatus.

2. An image forming apparatus having: a scanning function for executing a scanning process based on a scanning job; a printing function for executing a printing process based on a printing job; and a copy function for executing the scanning process and the printing process based on a copy job; wherein execution of the copy job performs parallel processing of the scanning process and the printing process;

the image forming apparatus comprising:
a free area determining unit configured to, when there is an instruction to execute the copy job, compares a capacity of a work area necessary for executing a job with a free area in memory;

a division process executing unit configured to, in a case where the free area determining unit determines that the free area in memory is equal to or greater than a capacity of a work area necessary for executing the scanning job, but is less than a capacity of a work area necessary for executing the printing job, cancels the parallel processing, and after executing the scanning process, saves in a non-volatile memory, and then after restarting, executes the printing process; and a sequential process executing unit configured to, in a case where the free area determining unit determines that the free area in memory is equal to or greater than a capacity of a work area necessary for executing the printing job, but is less than a capacity of a work area necessary for executing the copy job, cancels the parallel processing, and after executing the scanning process, executes the printing process, wherein the division process executing unit is configured to, in said case where the free area determining unit determines that the free area in memory is equal to or greater than a capacity of a work area necessary for executing the scanning job, but is less than a capacity of a work area necessary for executing the printing job, instruct a power supply unit to perform said restart, thereby causing said restart of the image forming apparatus.

\* \* \* \* \*